United States Patent

[11] 3,581,877

| [72] | Inventor | Nathaniel D. Goldberg |
| | | 154 E. Erie St., Chicago, Ill. 60611 |
| [21] | Appl. No. | 813,085 |
| [22] | Filed | Apr. 3, 1969 |
| [45] | Patented | June 1, 1971 |

[54] CONVEYOR GUIDE STRUCTURE
8 Claims, 6 Drawing Figs.

[52] U.S. Cl. ........................................ 198/204
[51] Int. Cl. ........................................ B65g 15/60
[50] Field of Search ........................................ 198/137,
181, 182, 189, 204

[56] References Cited
UNITED STATES PATENTS
3,193,077  7/1965  Goldberg .................... 198/204X
3,491,873  1/1970  Fauth ........................ 198/204

*Primary Examiner*—Evan C. Blunk
*Assistant Examiner*—Alfred N. Goodman
*Attorney*—Olson, Trexler, Wolters & Bushnell ABSTRACT: Guide rail structure for conveyor systems, which is designed to provide a smooth, friction free, nonmarring edge for engagement by containers or the like being transferred, and constructed such that it may be readily formed to a desired arcuate configuration. The structure includes a malleable rail element which carries thermoplastic bumper means that provide the aforementioned edge. The bumper means is comprised of a plurality of elements, operably interconnected by an expansion joint of novel design to obviate any problems due to expansion or contraction of the thermoplastic material, while affording a continuous edge along the entire length of a section of guide rail.

PATENTED JUN 1 1971　　3,581,877
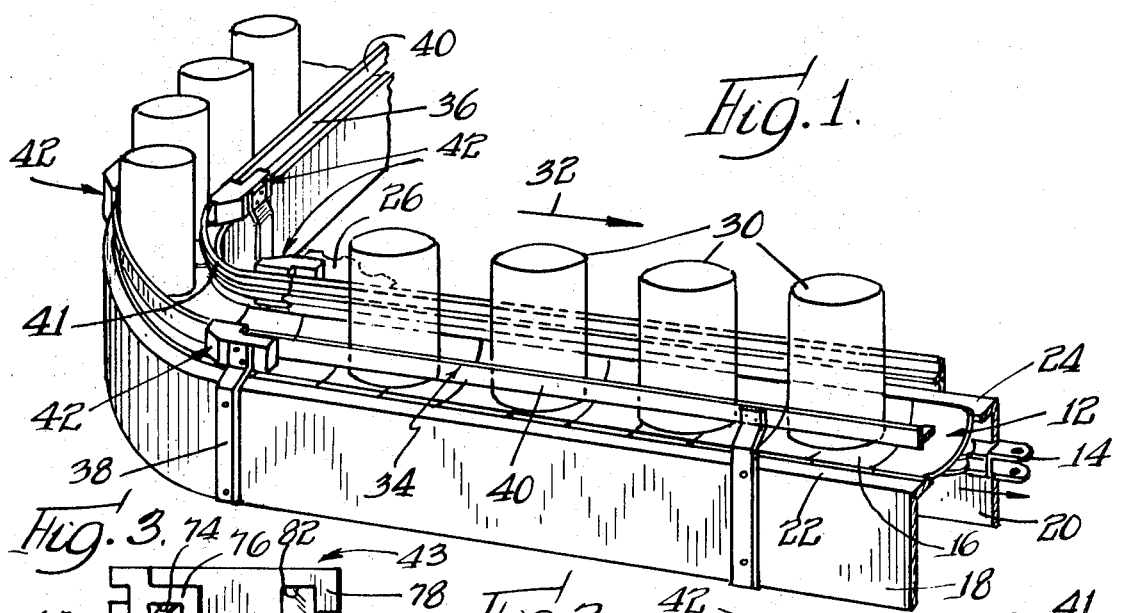
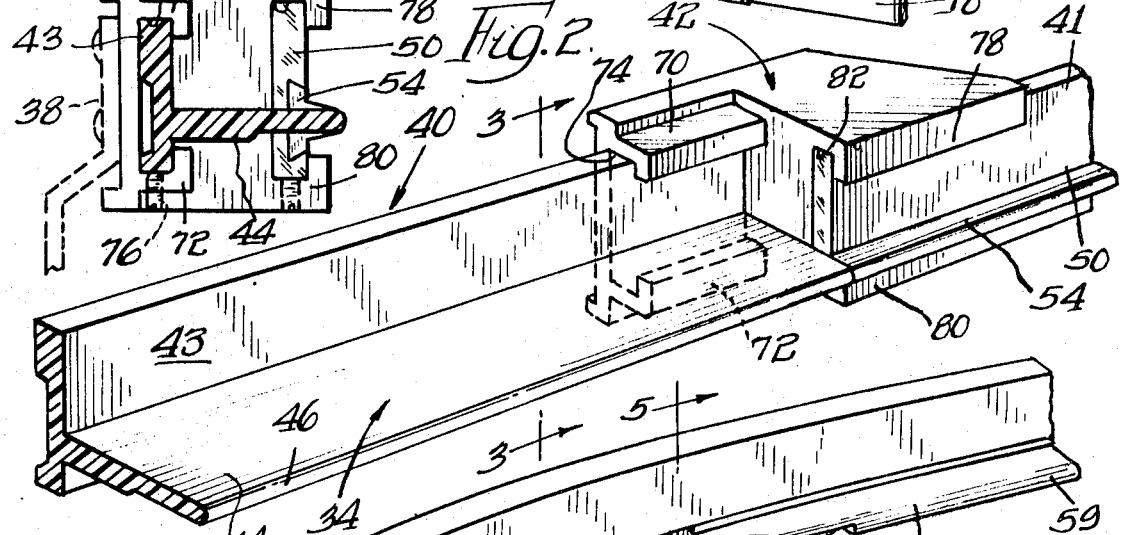
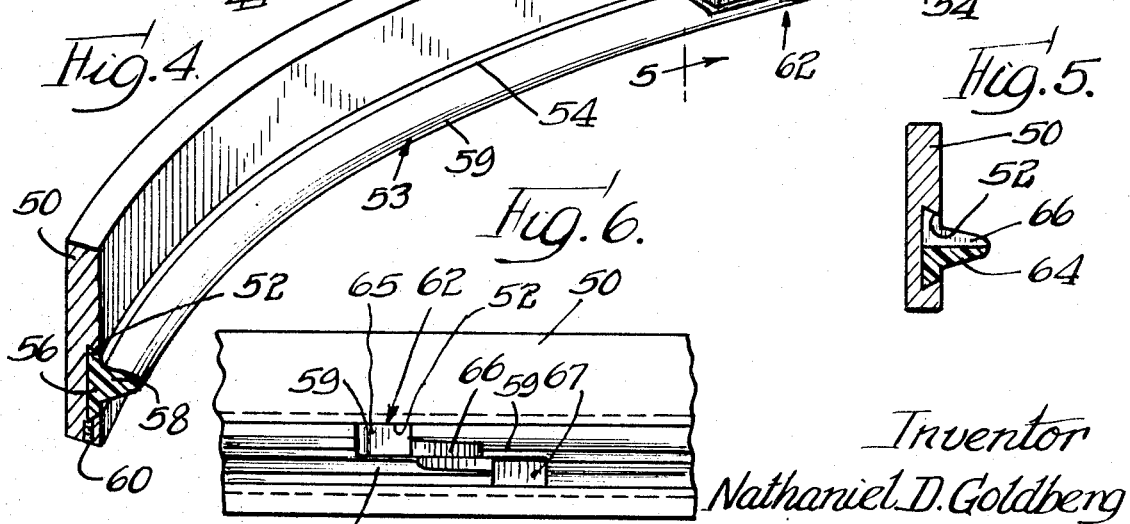
Inventor
Nathaniel D. Goldberg
By: Olson, Trexler, Wolters & Bushnell attys.

3,581,877

CONVEYOR GUIDE STRUCTURE

BACKGROUND OF INVENTION

The present invention relates to conveyor apparatus or the like. More particularly, the instant invention provides novel guide structure for conveyor apparatus which obviates numerous, longstanding problems in the art.

Conveyor systems of the general type to which the present invention relates are well known in the art and are employed in manufacturing or packaging operations to transfer articles from one work station to another. These systems normally include a motor driven, endless conveyor chain, which has a plurality of article-supporting plates or the like connected thereto, and a guide rail assembly extending along the length of the conveyor to prevent articles from toppling off the line, a problem of extreme criticality where the conveyor branches or a change of direction is effected.

While it is desirable to maintain a linear path of travel for the conveyed articles, quite often the space limitations in a plant or other factors make this impossible. Accordingly, the conveyor systems found in most plants follow rather torturous, serpentine paths and will often include both horizontal and vertical turns.

In the past, conveyor manufacturers have devoted considerable energy to research and experimentation in this area, and have developed numerous flexible conveyor chain designs capable of effectively handling changes in direction. By way of example, attention is invited to the following U.S. patents which illustrate systems of this type: U.S. Pat. Nos. 2,866,538 and 3,270,862, issued to N. D. Goldberg, applicant herein, on Dec. 30, 1958 and Sept. 6, 1966, respectively; U.S. Pat. No. 2,619,843, issued to C. W. Kampfer, on Dec. 2, 1952; and U.S. Pat. No. 2,157,283, issued to R. S. Dyson, on May 9, 1939.

With the above discussion as background, attention is now focused on the particular problems solved by the present invention.

The transfer by conveyors of the type discussed, of glass throwaway-type bottles and lithographed cans which have the product trade dress preapplied, gives rise to certain problems. More specifically, after filling, containers are relatively heavy, and engagement with the conveyor guard rails during transit often results in scratching, etching or marring of the container surfaces, depending of course upon the type of guard rail employed. This, while being encountered along the entire length of the conveyor, is particularly troublesome where the conveyor branches or a change in direction is effected.

In the case of lithographed cans, upon traversing the entire length of a conveyor system it is not uncommon to find the lithography, which makes up the trade dress for the container, scratched or otherwise marred at numerous locations. The result is a rather unattractive, shoddy looking container, which does not provide the consumer eye appeal desired and so necessary in an impulse-oriented market.

Regarding glass throwaway bottles, or similar containers of this general type, the engagement thereof with rough surfaces or sharp corners or edges results in a scratching or etching of the container surface. Accordingly, it has been found that this materially reduces the strength of the container and results in breakage during shipping or use.

In order to overcome this problem it was proposed to employ guide rails fabricated from a low friction, nonmarring, self-lubricating plastic material such as nylon or Delrin. However, while these plastic guide rails performed satisfactorily along the relatively linear portions of the system, they proved somewhat undesirable where sharp corners or abrupt changes in direction were to be negotiated.

In this regard, while these materials are readily fabricated in linear strips or lengths, the stiff, resilient nature of these plastics necessitates the use of special forming apparatus to produce curved sections. Thus, on-the-site fabrication of curved sections could not be effected and each corner section had to be fabricated to order within relatively close tolerances.

In addition, these materials are extremely hydrophilic. Thus, once installed on a conveyor line, guide rails of this type tend to expand and contract, depending on the humidity and the temperature of the surrounding atmosphere, which may result in buckling of the guide rail.

SUMMARY OF INVENTION

Accordingly, it is the general object of the present invention to overcome the problems and disadvantages of the prior art structures enumerated above.

A more specific object of the present invention is to provide novel guide rail structure which can be easily formed at the installation site while providing for relatively low friction, nonmarring engagement with the containers being transported.

Still another object of the invention is the provision of a unique guide rail construction which utilizes a malleable rail section that can be easily formed, and includes a thermoplastic bumper means to provide low friction, nonmarring engagement with the containers.

A further object of the present invention is the provision of guide rail structure as defined in the preceding paragraph wherein a novel expansion joint arrangement for said bumper means is employed, which obviates problems due to expansion and contraction while affording a smooth, continuous edge against which the containers engage.

The above specified objects and advantages of the present invention, as well as others which will be apparent to those skilled in the art from the following detailed description of the invention, are attained by the provision of guide rail structure comprising: an elongate malleable rail element having a dovetail groove formed in a surface thereof and bumper means carried thereby, said bumper means including, a plurality of associated elongate thermoplastic elements, each element having a base portion which is disposed in said groove and an elongate rib portion extending from said rail surface, and expansion compensating means for permitting adjacent thermoplastic elements to expand and contract relative to each other.

DESCRIPTION OF THE DRAWINGS

FIG. 1 is a fragmentary perspective view showing a portion of a conveyor system utilizing features of the present invention.

FIG. 2 is an enlarged fragmentary perspective view showing one form of fitting that may be employed to connect a one-piece plastic guide rail with a guide rail section constructed in accordance with the present invention.

FIG. 3 is a sectional view taken along the line 3-3 of FIG. 2, in the direction indicated.

FIG. 4 is a fragmentary perspective view of a section of guide rail constructed in accordance with the present invention, and illustrating a preferred form of the expansion-compensating joint employed for the thermoplastic bumper means.

FIG. 5 is a sectional view taken along the line 5-5 of FIG. 4, in the direction indicated.

FIG. 6 is a fragmentary elevational view of the expansion joint for the guide rail of the present invention.

DESCRIPTION OF THE ILLUSTRATED EMBODIMENT

Referring now more specifically to the drawings wherein like parts are designated by the same numerals throughout the various figures, a portion of a conveyor system 10 incorporating the guide rail construction of the present invention is shown in FIG. 1. The conveyor 10 includes an elongate flexible conveyor chain structure 12, which is of the general type illustrated and disclosed in the aforementioned U.S. patents. The conveyor chain 12, which is of an endless configuration, includes a sprocket chain assembly 14 having a plurality of article-carrying plates 16 affixed thereto. Conveyor chain structure 12 extends between the spaced, parallel frame members 18 and 20, each of which has a transverse flange portion, designated 22 and 24, respectively, upon which the lower surfaces of the plates 16 ride during operation.

A sprocket gear 26, driven by a motor (not shown) is suitably mounted at the corner 29 of a conveyor structure 10 in driving engagement with the sprocket chain 14. As illustrated in FIG. 1, the conveyor plates 16 support a plurality of articles 30, such that by means of the sprocket gear 18 and its meshing engagement with sprocket chain 14, the entire chain structure 12 and the supported articles may be advanced in the direction indicated by arrow 32.

To prevent the articles 30 from toppling off the conveyor and to assist the articles in negotiating corner 29, a pair of spaced, parallel guide rail assemblies are employed. The assemblies are designated 34 and 36, generally, and are maintained in position by brackets 38 affixed to frame members 18 and 20. The respective guide rail assemblies 34 and 36 are of similar construction. Accordingly, only one of said assemblies is illustrated in and will be discussed with reference to FIGS. 2—6, said assembly illustrated being the outer assembly 34.

The guide rail assembly 34 includes a plurality of straight or linear sections 40, and the arcuate section 41 used at the corner 29. The arcuate section 41 is joined to linear sections 40 at the ends thereof by means of a fitting 42, which will be discussed more fully hereinafter.

The relatively straight or linear sections 40 are constructed preferably of a low friction, thermoplastic material. With reference to FIG. 2, it can be seen that section 40 includes a substantially vertical base portion 43 and a horizontally depending flange or rib 44 having an edge 46 which is the portion thereof engaged by containers 30. Since the entire section 40 is constructed from a relatively low-friction plastic material the containers will slide easily along the edge 46 and there is no danger of scratching or otherwise marring the outer surfaces of the containers.

As will be recalled from the previous discussion, thermoplastic guide rails of the general type represented by section 40 are known in the art. However, while this type of guide rail is effective long linear portions of the conveyor, it does not lend itself to use at corners. Such is the case, due to the relatively stiff, resilient nature of the material used to fabricate these guide rails and their hydrophilic properties.

Turning now to the present invention, the guide rail structure 41, is of a novel construction, such that it can be used for the arcuate portions of a conveyor, as well as linear sections, while affording all of the advantages of one-piece thermoplastic guide rails without giving rise to the aforediscussed inherent disadvantages.

More specifically, with reference to FIG. 4, the arcuate guide rail section 41 includes a malleable metal strip or rail member 50 which can easily be formed into any desired shape. The elongate rail 50 has a dovetail channel 52 formed therein which receives and supports bumper means 53 formed from a low-friction thermoplastic material.

Bumper means 53 are comprised of a plurality of elongate thermoplastic members 54, each of which includes a base portion 56 complementary in shape to the dovetail channel 52, and an outwardly extending rib portion 58 which presents an edge 59 for engagement by the articles 30. By virtue of the dovetail channel 52 and the correspondingly shaped base portion 56, the respective thermoplastic members 54 are slidably disposed in said channel 52 from an open end thereof. Setscrews 60 are provided along the length of rail 50 which will engage and maintain the sections 54 in position.

Since the elongate thermoplastic members 54 are subject to the aforediscussed problems of expansion and contraction, an expansion joint 62 is provided between adjacent members 54, as illustrated in FIG. 4.

The overall construction of the expansion joint 62 can best be understood with reference to FIGS. 5 and 6. Directing attention first to FIG. 6, the ends of adjacent members 54 have been relieved to provide opposed extensions 64 and 66. When viewed in section, it can be seen that extensions 64 and 66 are in effect mirror image parts. In the illustrated embodiment, each said extension in section approximates one-half of the original cross-sectional configuration of members 54, with extension 66 corresponding to the upper half and extension 64 to the lower half thereof. This relationship is best viewed in FIG. 5.

Accordingly, with the members 54 assembled in channel 52, the extensions 64 and 66 cooperate with said channel to define the recesses or spaces designated 65 and 67, respectively, in FIG. 6. Each said recess, 65 or 67, is adapted to receive the extension formed on the adjacent member 54, such that said extensions 64 and 66 are placed in overlapping engagement in the assembled condition.

Thus, while the lapped extensions 64 and 66 may be in sliding contact, they do not abut, and the respective thermoplastic members 54 may expand or contract without any danger of buckling. In addition, due to the complementary, mirror image configuration of the extension 64 and 66 and the lapped engagement, a hiatus in the rib structure 58 is avoided and a continuous container-engaging edge 59 is provided along the entire length of section 41. The continuous nature of edge 59 will be maintained irrespective of the expansion or contraction of the respective thermoplastic members 54.

From the preceding discussion it will be recalled that a fitting 42 is provided for interconnecting the linear guide rail sections 40 with an arcuate section 41. The construction of fitting 42 can best be viewed with reference to FIGS. 2 and 3.

In this regard, fitting 42 includes a first pair of spaced, L-shaped flanges 70 and 72 which define a channel 74. The channel 74 is sized to receive the base portion 42 of the linear rail section 40, and as setscrew 76 or the like may be employed to maintain the linear section 40 in position. A second pair of opposed L-shaped flanges 78 and 80 are provided on fitting 42 which define a second channel 82 for reception of the rail member 50 of the arcuate guide rail section 41.

As is best viewed in FIG. 3, the fitting 42 is designed in accordance with the dimensions of the guide rail sections 40 and 41 such that the respective rib portions 44 and 58 abut with their edges 46 and 59 in alignment. Thus, it can be seen that a relatively smooth, continuous edge, extending along the entire length of the guide rail assembly 34, is provided for engagement with the containers 30 being transported.

Briefly then, with the present invention, a workman installing or servicing a conveyor can readily bend or form the guide rail section 41 to the desired shape, due to the malleable nature of rail element 50. In addition, the ribs 58 of the respective thermoplastic members 54 which make up the bumper means 52 afford a smooth edge 59 for engagement with the containers 30 as they negotiate corner 29, thus precluding scratching or marring of the container surfaces. Also, by virtue of the expansion joint 62 the edge 59 is substantially continuous along the entire length of section 41, and any problems due to expansion or contraction of the thermoplastic material are obviated.

If, in practice, it becomes necessary to join two rail sections 41 together, a fitting somewhat along the general nature of fitting 42 may be employed. In this regard, the fitting includes but a single elongate channel within which the ends of sections to be joined are disposed. The ends of the respective sections, including their rib portions, are abutted, and setscrews, or the like, used to hold the sections in place.

While the embodiment shown and described is a preferred form of the invention, and has been employed for purposes of illustration and understanding, it is envisioned that others skilled in this art may devise modifications or changes without departing from the spirit and scope of the invention, which are defined by the claims appended hereto.

What I claim is:

1. 1. In combination with a conveyor or the like, guide rail structure comprising: an elongate malleable rail section having a groove formed in a surface thereof and bumper means carried thereby, said bumper means including, a plurality of associated elongate thermoplastic elements, each element having a base portion disposed in said groove and an elongate rib portion extending from said rail surface, and expansion compensating means for permitting adjacent thermoplastic elements to expand and contract relative to each other, said expansion compensating means including an extension formed on juxtaposed ends of said adjacent elements, each said extension being of a cross-sectional configuration approximating one-half the cross section of said thermoplastic element and said extending being lapped to provide a substantially continuous rib along the length of said rail section.

2. The combination as defined in claim 1, wherein said extensions are mirror images of one another.

3. The combination as defined in claim 1, wherein said guide rail structure further includes: an elongate thermoplastic guide rail section having a unitary elongate rib, and a fitting providing a joint between said elongate thermoplastic guide rail section and said malleable rail, with the integral rib on said thermoplastic guide rail section abutting and in alignment with the rib portion of said bumper means.

4. Guide rail structure for use with a conveyor system, and particularly adapted for use at a corner or turn in said system, said guide rail structure comprising: an elongate malleable rail section having a groove formed in a surface thereof and bumper means carried thereby, said bumper means including a plurality of associated elongate thermoplastic elements, each element having a base portion which is disposed in said groove and an elongate rib portion extending from said rail surface, and expansion-compensating means for permitting adjacent thermoplastic elements to expand and contract relative to each other, said expansion-compensating means including an extension on juxtaposed ends of said adjacent elements, each said extension being of a cross-sectional configuration approximating one-half the cross section of said elements, and said extensions being lapped to provide a substantially continuous lap along the length of said rail structure.

5. The guide rail structure as defined in claim 4, wherein said extensions are mirror images of one another.

6. For use with a conveyor, guide rail structure comprising: a first, linear thermoplastic guide rail section having a unitary rib extending the length thereof; a second malleable rail section having a groove in a surface thereof and capable of being formed into an arcuate configuration to conform to nonlinear segments of said conveyor, and bumper means disposed in said groove, said bumper means comprising an elongate thermoplastic element having a base portion received in said groove and an elongate rib portion extending from said rail surface; and a fitting for connecting said linear guide rail section and said malleable rail section, said fitting including means for receiving an end of both said linear and said malleable rail sections with the unitary rib of said linear section abutting and in alignment with the rib portion of said malleable section.

7. Guide rail structure as defined in claim 6 wherein said bumper means include a plurality of said elongate thermoplastic elements, each said element being associated with an adjacent element by extensions formed on juxtaposed ends thereof, said extensions being lapped and providing expansion-compensating means.

8. Guide rail structure as defined in claim 7 wherein said extensions are mere image parts, each corresponding to approximately one-half the cross-sectional configuration of said element, whereby when said extensions are lapped, a continuous rib is provided.